US010495722B2

(12) United States Patent
O'Brien et al.

(10) Patent No.: US 10,495,722 B2
(45) Date of Patent: Dec. 3, 2019

(54) SYSTEM AND METHOD FOR AUTOMATIC DETERMINATION OF LOCATION OF AN AUTONOMOUS VEHICLE WHEN A PRIMARY LOCATION SYSTEM IS OFFLINE

(71) Applicant: Walmart Apollo, LLC, Bentonville, AR (US)

(72) Inventors: John J. O'Brien, Farmington, AR (US); Robert Cantrell, Herndon, VA (US); David Winkle, Bella Vista, AR (US); Todd Mattingly, Bentonville, AR (US); Donald R. High, Noel, MO (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/219,615

(22) Filed: Dec. 13, 2018

(65) Prior Publication Data

US 2019/0187239 A1    Jun. 20, 2019

Related U.S. Application Data

(60) Provisional application No. 62/599,462, filed on Dec. 15, 2017.

(51) Int. Cl.
*H04W 24/00* (2009.01)
*G01S 5/02* (2010.01)
(Continued)

(52) U.S. Cl.
CPC .......... *G01S 5/0263* (2013.01); *G01S 5/0242* (2013.01); *G01S 5/14* (2013.01); *G01S 5/16* (2013.01); *G01S 17/48* (2013.01)

(58) Field of Classification Search
CPC ...... G01S 5/0263; G01S 5/0242; G01S 17/48; G01S 5/16; G01S 5/14; G01S 5/0252;
(Continued)

(56) References Cited

U.S. PATENT DOCUMENTS 8,027,761 B1   9/2011 Nelson
8,214,147 B2   7/2012 Cheok et al.
(Continued)

FOREIGN PATENT DOCUMENTS

WO   2017092801 A1   6/2017

OTHER PUBLICATIONS

International Search Report and Written Opinion dated Mar. 25, 2019, issued in corresponding PCT Application No. PCT/US2018/065431.

(Continued)

*Primary Examiner* — Dai Phuong
(74) *Attorney, Agent, or Firm* — Venable LLP; Jeffri A. Kaminski

(57) ABSTRACT

Systems, methods, and computer-readable storage media for identifying, on an autonomous vehicle which is traveling, a loss of a primary location system, and activating a secondary location system. The secondary location system performs a radio frequency sweep of a geographic area around the autonomous vehicle to identify radio frequency beacons, compares the radio frequency beacons to known ground stations, performs a visual scan of the geographic area to identify visual beacons, each visual beacon having a particular visual frequency, and compares the particular visual frequency of each of the visual beacons to known visual beacons. The secondary location system then identifies a current location of the autonomous vehicle by triangulating the verified radio frequency beacons and the verified visual beacons and the autonomous vehicle generates a route to a stopping location based on the current location produced by the secondary location system.

20 Claims, 5 Drawing Sheets

(51) Int. Cl.
*G01S 5/14* (2006.01)
*G01S 5/16* (2006.01)
*G01S 17/48* (2006.01)

(58) Field of Classification Search
CPC .......... G01S 5/02; H04W 4/02; H04W 64/00; H04L 29/08657; H04L 29/08108; H04L 29/08936; H04M 1/72572; G01C 21/20
See application file for complete search history.

(56) References Cited

U.S. PATENT DOCUMENTS

| | | | |
|---|---|---|---|
| 8,909,391 B1 | 12/2014 | Peeters et al. | |
| 9,070,236 B1 | 6/2015 | Diesposti | |
| 9,679,490 B2 | 6/2017 | Ceribelli et al. | |
| 2014/0032021 A1* | 1/2014 | Metzler | G01S 5/0036 701/3 |
| 2014/0266789 A1 | 9/2014 | Matus | |
| 2015/0073705 A1* | 3/2015 | Hiwatashi | G01S 19/48 701/468 |
| 2015/0142211 A1 | 5/2015 | Shehata et al. | |
| 2016/0259333 A1* | 9/2016 | Ducharme | G05D 1/0676 |
| 2016/0381513 A1* | 12/2016 | Luo | G01S 5/0252 455/456.1 |
| 2017/0238136 A1* | 8/2017 | Smith | H04W 4/029 455/456.3 |
| 2018/0141661 A1* | 5/2018 | Natarajan | B64C 39/024 |
| 2018/0186369 A1* | 7/2018 | Reiff | B60W 10/04 |

OTHER PUBLICATIONS

DIY Drones "Precise indoor positioning with ultrawideband", Jun. 26, 2015, pp. 1-9. electronically retrieved from https://diydrones.com/profiles/blogs/precise-indoor-positioning-with-ultrawideband, on Sep. 29, 2017.

Sun et al., "A Camera-Based Target Detection and Positioning UAV System for Search and Rescue (SAR) Purposes", Sensors MDPI, 2016, pp. 1-24.

Junjie Liu, "Survey of Wireless Based Indoor Localization Technologies", 2014, pp. 1-14, electronically retrieved from https://www.cse.wustl.edu/~jain/cse574-14/ftp/indoor/, on Sep. 29, 2017.

Serrano et al., "Seamless Indoor-Outdoor Navigation for Unmanned Multi-Sensor Aerial Platforms", Aerospace Technology Center & Ohio University, Feb. 12-14, 2014, pp. 1-8.

* cited by examiner

SYSTEM AND METHOD FOR AUTOMATIC DETERMINATION OF LOCATION OF AN AUTONOMOUS VEHICLE WHEN A PRIMARY LOCATION SYSTEM IS OFFLINE

PRIORITY

The present application claims priority to U.S. Provisional Patent Application No. 62/599,462, filed Dec. 15, 2017, the contents of which are incorporated herein in their entirety.

BACKGROUND

1. Technical Field

The present disclosure relates to how an autonomous vehicle can determine its location, and more specifically to how the autonomous vehicle determines its location when a primary location system is offline.

2. Introduction

Navigation systems generally operate in one of two ways: movement-based direction finding, where determining location is based on knowing how far one has moved with respect to a known point (for example, knowing you walked exactly one mile West of a known point); or based on triangulation between known points (for example, using buildings, mountains, or even constellations to determine location). The most common navigation tool in use today, the GPS (Global Positioning System), relies on a system of triangulation using signals from orbiting satellites.

Autonomous vehicles, such as drones, UAVs (Unmanned Aerial Vehicles), self-driving cars, delivery robots, shelf-stacking robots, etc., rely on navigation systems to know where they currently are located and to perform their assigned tasks. In general, this system works without error. However, there are circumstances where, through hardware failure, intrusion, or other error, the primary navigation system fails, and the autonomous vehicle must react to the situation in a manner which protects any nearby people, and preferably protects cargo and the vehicle from harm.

Technical Problem

How an autonomous vehicle can determine its location when a primary location system is offline.

SUMMARY

Systems and autonomous vehicles configured according to this disclosure can perform processes and methods, an example of which can include: identifying, on an autonomous vehicle which is traveling, a loss of a primary location system, the primary location system comprising Global Positioning System navigation; activating a secondary location system which: performs a radio frequency sweep of a geographic area around the autonomous vehicle to identify radio frequency beacons; compares the radio frequency beacons to known ground stations, to yield verified radio frequency beacons; performs a visual scan, via a camera, of the geographic area to identify visual beacons, each visual beacon having a particular visual frequency; compares the particular visual frequency of each of the visual beacons to known visual beacons, to yield verified visual beacons; and identifies a current location of the autonomous vehicle by triangulating the verified radio frequency beacons and the verified visual beacons; and generating a route to a stopping location based on the current location produced by the secondary location system.

An example system or autonomous vehicle configured according to this disclosure can include: a primary location system, the primary location system using Global Positioning System navigation; a secondary location system; a processor; and a computer-readable storage medium having instructions stored which, when executed by the processor, cause the processor to perform operations comprising: identifying, on an autonomous vehicle which is traveling, a loss of the primary location system; activating the secondary location system which: performs a radio frequency sweep of a geographic area around the autonomous vehicle to identify radio frequency beacons; compares the radio frequency beacons to known ground stations, to yield verified radio frequency beacons; performs a visual scan, via a camera, of the geographic area to identify visual beacons, each visual beacon having a particular visual frequency; compares the particular visual frequency of each of the visual beacons to known visual beacons, to yield verified visual beacons; and identifies a current location of the autonomous vehicle by triangulating the verified radio frequency beacons and the verified visual beacons; and generating a route to a stopping location based on the current location produced by the secondary location system.

An example computer-readable storage medium configured according to this disclosure can include: identifying, on an autonomous vehicle which is traveling, a loss of a primary location system, the primary location system comprising Global Positioning System navigation; activating a secondary location system which: performs a radio frequency sweep of a geographic area around the autonomous vehicle to identify radio frequency beacons; compares the radio frequency beacons to known ground stations, to yield verified radio frequency beacons; performs a visual scan, via a camera, of the geographic area to identify visual beacons, each visual beacon having a particular visual frequency; compares the particular visual frequency of each of the visual beacons to known visual beacons, to yield verified visual beacons; and identifies a current location of the autonomous vehicle by triangulating the verified radio frequency beacons and the verified visual beacons; and generating a route to a stopping location based on the current location produced by the secondary location system.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
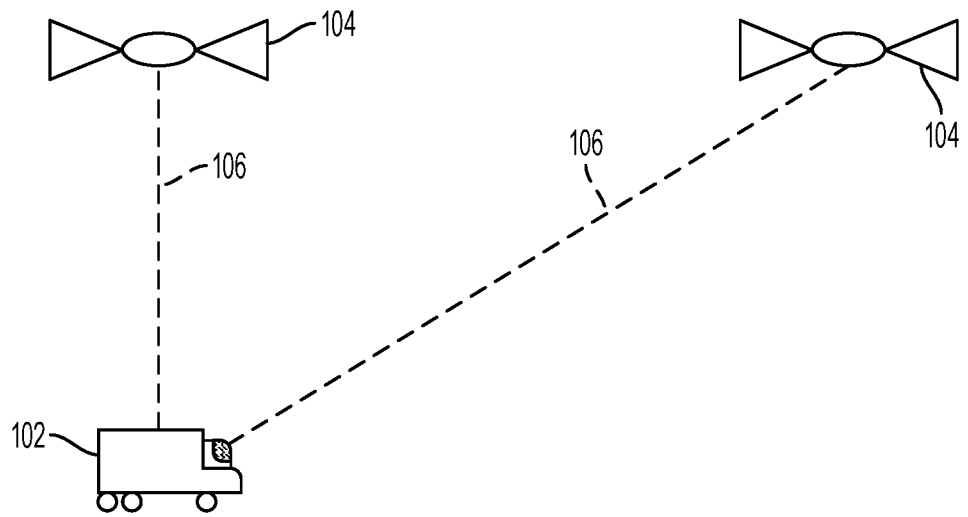
FIG. 1 illustrates an example of a primary navigation system using GPS navigation.

A system, method and computer-readable media are disclosed which provide for secondary location systems to be implemented when a primary location system is offline. An exemplary primary location system can include GPS positioning. Another example of a primary location system may be an imaging system which relies on real-time images, coupled with a record of previous locations, to identify the current location. When the primary location system is offline, meaning the primary location system is broken, disabled, hacked, interfered with, etc., a secondary location system or multiple secondary location systems may be implemented to identify the location of the unmanned vehicle. Upon identifying the location of the unmanned vehicle using the secondary location system(s), the unmanned vehicle searches for a safe place to stop.

One example of a secondary location system can be image-based triangulation using images of buildings, landscapes (mountains, rivers), street signs, or other landmarks. For example, the unmanned vehicle can, upon determining the primary location system is offline, take photographs of its surroundings, then perform an image comparison of the photographs to known landmarks. In some configurations, the image comparison occurs on the unmanned vehicle. Such configurations can be useful where the unmanned vehicle is unable to communicate with outside resources. In other configurations, the image comparison can occur on servers or outside resources, where the unmanned vehicle transmits the images to the remote server, the server performs an image analysis to (1) identify the contents of the image, (2) identify a location corresponding to the image, and (3) transmit the location back to the unmanned vehicle.

A similar example of a secondary location system can be performing a visual scan, or otherwise capturing images, of visual beacons. Examples of visual beacons can include lights on radio towers which pulse at specific intervals, lights on planes or drones which convey the identity of the vehicle (or at least identify that the vehicle is present), or lights which broadcast at specific frequencies, patterns, spectrums, or rates so as to identify the light, in a manner similar to how many water buoys and lighthouses work. For buoys and lighthouses, the lights are in known locations and broadcast at predetermined frequencies. Similar lights may be used as navigational landmarks for secondary location systems of autonomous vehicles configured according to this disclosure. For example, an LED light could be configured to shine at a specific frequency, or with a specific pattern, such that the frequency or pattern identifies the beacon.

In some cases, the system can have an infrared or ultraviolet image scanner which captures images of frequencies which are not visible to the human eye. For example, rather than creating additional visual beacons which are visible to the human eye, infrared or ultraviolet beacons can be placed which broadcast at specific frequencies, patterns, spectrums, or rates. The secondary location system aboard the autonomous vehicle can then use a camera configured to capture that ultraviolet/infrared information and use it to identify the current location of the autonomous vehicle.

Another example of a secondary location system can be performing a RF (Radio Frequency) scan of nearby radio towers. Each tower can broadcast a known signal having frequency, amplitude, modulation, content, and/or metadata which allows the tower to be uniquely identified. Because the tower and its respective location are known, the unmanned vehicle (or a server analyzing the data) can use the tower signal to determine its with respect to the tower. For example, the unmanned drone can perform triangulation between multiple signals from multiple towers.

In some configurations, the unmanned vehicle can use combinations of the various secondary location systems described. For example, the unmanned vehicle may have taken a picture of a mountain to the West, identified an RF beacon to the North, and an LED light to the East. Using these multiple points of reference, the unmanned vehicle can triangulate its current location.

In some configurations, the RF scan of a nearby geographic area for RF beacons and signals can be used to narrow the number of images the unmanned vehicle needs to process in order to make a good approximation (within a threshold level of approximation) of the unmanned vehicle's current location. For example, rather than executing full and complete image processing all of the images captured (meaning analyzing the images for shapes and objects, then comparing those shapes and objects to a database), the unmanned vehicle may be able to determine, using the information gleaned from the RF beacons, that only certain images, or certain ranges of images, need to be processed. In one example, the unmanned vehicle may continue to process images in the direction of motion of the vehicle, and within a 15° arc of that direction of motion, while ignoring (not processing) other images which have been taken, or could be taken, around the vehicle. In another example, the unmanned vehicle may have identified multiple RF beacons, LED lights, landmarks, etc., and can direct future imaging to only be directed to those specific points of interest.

Because the primary location system is offline, the unmanned vehicle may need to quickly stop moving. However, immediately stopping, for both ground and aerial unmanned vehicles, can be dangerous or undesirable for any number of reasons. Rather than immediately stopping, the unmanned vehicle can, upon identifying its current location, plan a route to a safe stopping location. In some cases, this can involve using onboard maps coupled with the current location to generate a route to the nearest appropriate stopping location. In other cases, the route generation can use the current location coupled with images of nearby obstacles to generate a route to the stopping location.

In some cases, particularly for flying autonomous vehicles (e.g., drones), loss of the primary navigation system can result in no longer having access to an altimeter. In such cases, the secondary navigation system can use the triangulation of images and signals, as well as the angles used to receive those images and signals, to generate a calculated altitude. This process may also require the use of a topographical map, which can be stored on the autonomous vehicle or at a server (wherever the triangulation process is occurring), in order for the current altitude to be determined. In other configurations, a secondary navigation system can include a backup altimeter or other way of receiving altitude information.

Various embodiments of the disclosure are illustrated in FIGS. 1-6, and are described in detail below. While specific implementations are described, it should be understood that this is done for illustration purposes only. Other components and configurations may be used without parting from the spirit and scope of the disclosure.

FIG. 1 illustrates an example of a primary navigation system using GPS navigation. In this example, the autonomous vehicle 102 is a truck 102, and GPS satellites 104 are respectively transmitting signals 106 which are received by the truck 102. The GPS navigation system on the truck 102 can then identify where the truck 102 is currently located.

Figure 2:
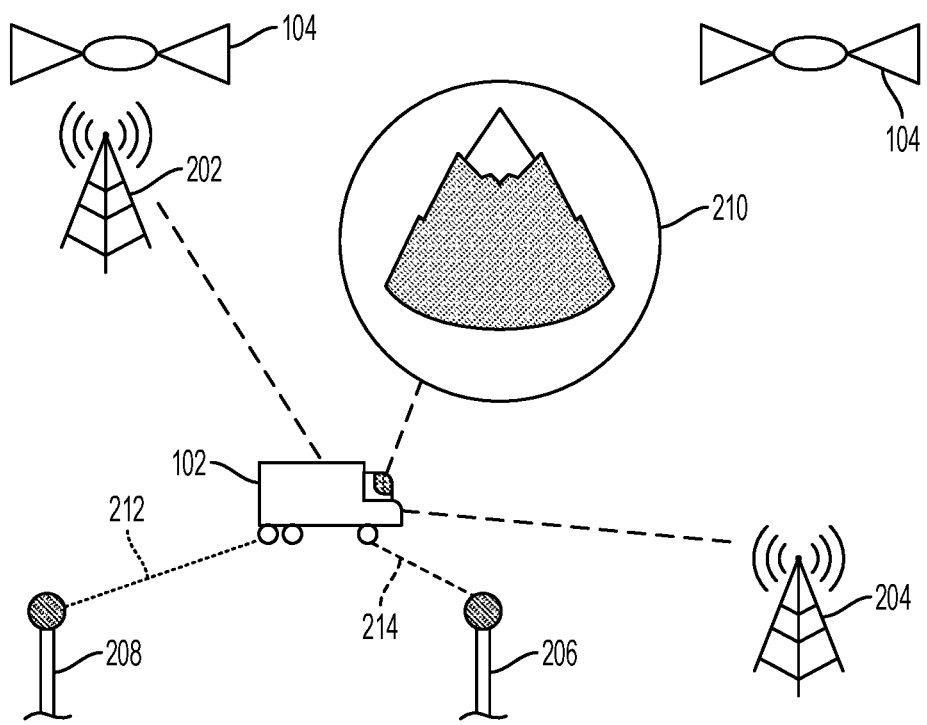
FIG. 2 illustrates an example of navigating using alternative navigation on a ground-based autonomous vehicle.

FIG. 2 illustrates an example of navigating using alternative navigation on the truck 102. In this example, the primary location system, the GPS system, is offline, meaning the satellites 104 are not broadcasting, the signals from the satellites 104 previously received at the truck 102 are not being received, the truck's GPS system is broken (i.e., the receiver cannot properly process the GPS signals), or any other cause for the GPS system to be inactive. In order to continue identifying the current location of the autonomous truck 102, secondary location systems are engaged which can (1) take pictures of landmarks 210, (2) scan for RF towers 202, 204, and/or (3) look for visual beacons 206, 208. In this example, the visual beacons 206, 208 are respectively transmitting in distinct patterns, with one beacon 206 transmitting a -•-•- 214 pattern, and the other beacon 28 transmitting a -••-••- 212 pattern. These patterns 212, 214 can, for example, correspond to the time periods when the lights are turned on and off, similar to Morse code. In other configurations, the patterns 212, 214 can correspond to distinct modulations, variations, or changes to the light being produced by the respective beacons 206, 208.

Figure 3:
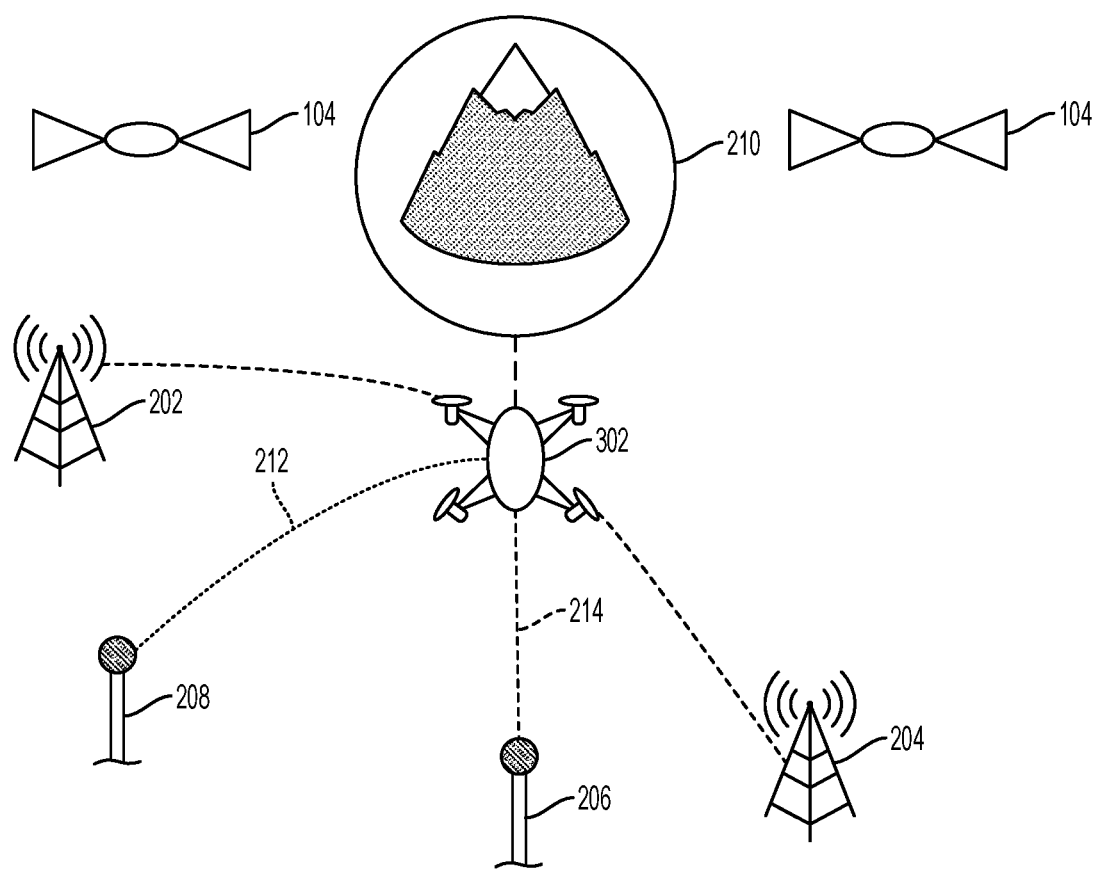
FIG. 3 illustrates an example of navigating using alternative navigation on an aerial-based autonomous vehicle.

FIG. 3 illustrates a similar example to that of FIG. 2, however in this case, the autonomous vehicle is an aerial drone 302 rather than the autonomous truck 102. While the height of the drone 302 becomes an important factor in determining the current location, other elements of the secondary location system can be identical to that of the ground-based vehicle of FIG. 2. For example, the systems and implementation of performing an RF scan to identify the RF towers 204, a visual beacon scan to identify visual beacons 206, 208, or a landmark scan to identify physical landmarks 210, can implement the same processes used for ground vehicles. However, when performing the triangulation based on the data received, the resulting location may have an additional height component. The height can, for example, be based on the angles of landmarks within the photographs, or the position within the image of a known landmark.

Figure 4:
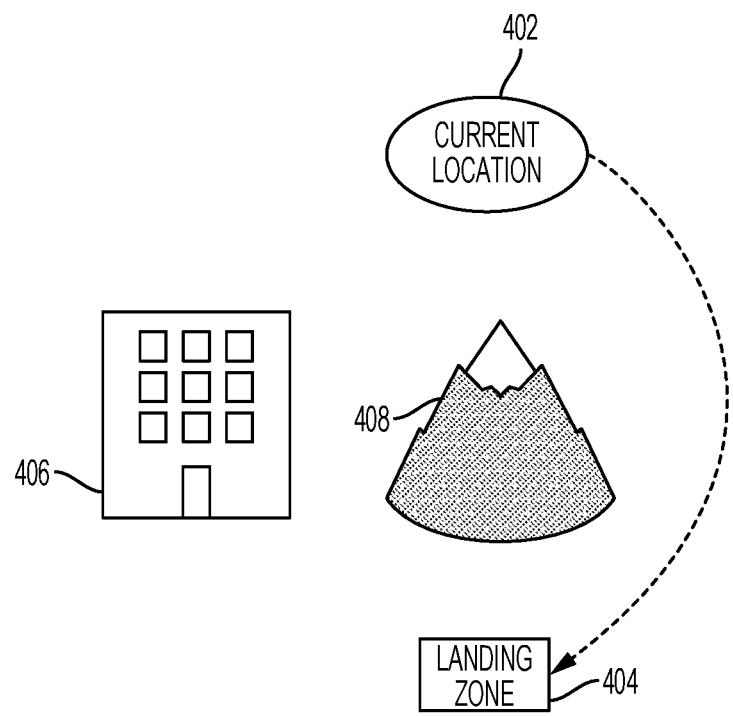
FIG. 4 illustrates exemplary routing to a stopping zone.

FIG. 4 illustrates exemplary routing to a stopping zone, where an autonomous vehicle can stop and wait for retrieval. In the case of an aerial drone, the stopping zone can be a landing zone. In the case of a ground-based drone, the stopping zone can be a safe place to park. In a preferred circumstance, the autonomous vehicle would be able to return to a designated loading/retrieval location. For example, if the autonomous vehicle is a delivery vehicle, the vehicle could identify the stopping location as the distribution center where the drone normally is loaded, refuels, or waits between deliveries. In the case of an autonomous vehicle used for a taxi service, the preferred stopping location could be a charging location. However, in cases where returning to a preferred stopping location is not feasible, the autonomous vehicle may need to identify an alternative stopping zone.

To identify an alternative stopping zone, the autonomous vehicle can consult a map of the area stored within memory of the autonomous vehicle, where possible stopping/landing zones 404 have been pre-designated. In the example illustrated in FIG. 4, the processor can compare the landing zones 404 nearby with the current location 402 of the autonomous vehicle, then identify, based on captured images, objects 406, 408 which make a planned route 410 near those objects impossible. The processor can then plan an alternative route to the stopping zone 404, avoiding those areas which, based on real-time imagery, should be avoided.

Figure 5:
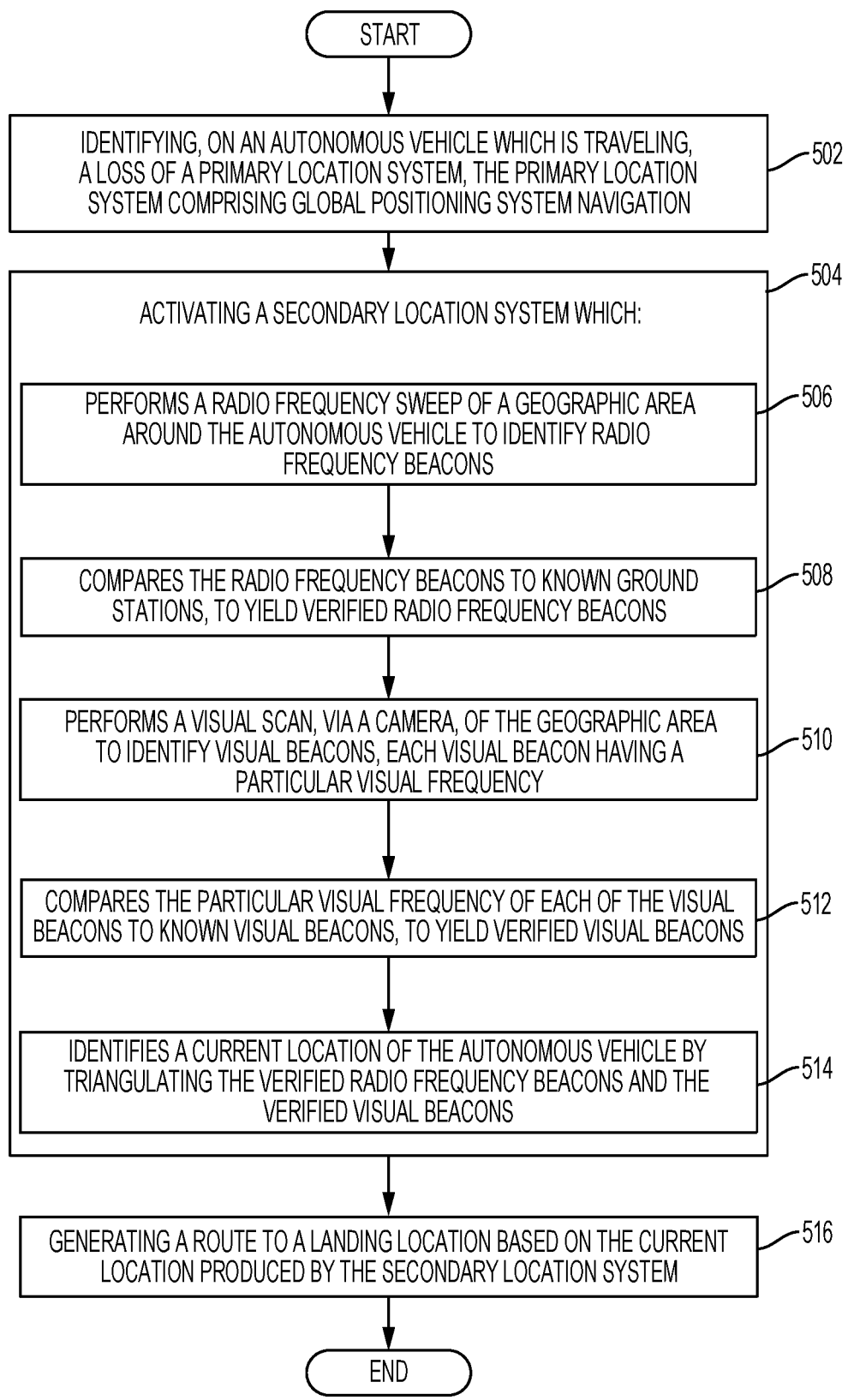
FIG. 5 illustrates an example method embodiment.

FIG. 5 illustrates an example method embodiment. The steps outlined herein are exemplary and can be implemented in any combination thereof, including combinations that exclude, add, or modify certain steps. A method provides for identifying, on an autonomous vehicle which is traveling, a loss of a primary location system, the primary location system comprising Global Positioning System navigation (502). Other exemplary primary location systems can include image systems, mileage systems, etc. The autonomous vehicle then activates a secondary location system which (504): performs a radio frequency sweep of a geographic area around the autonomous vehicle to identify radio frequency beacons (506), compares the radio frequency beacons to known ground stations, to yield verified radio frequency beacons (508), and performs a visual scan, via a camera, of the geographic area to identify visual beacons, each visual beacon having a particular visual frequency (510). The autonomous vehicle compares the particular visual frequency of each of the visual beacons to known visual beacons, to yield verified visual beacons (512) and identifies a current location of the autonomous vehicle by triangulating the verified radio frequency beacons and the verified visual beacons (514). The autonomous vehicle then generates a route to a stopping location based on the current location produced by the secondary location system (516).

In some configurations, the visual beacons can be LED lights configured to shine vertically upward. The LED lights can shine with a pattern or frequency which conveys the identity of the LED light. Similarly, in some configurations the radio frequency beacons can transmit metadata containing beacon identification. Modulation or metadata, transmitted as part of either LED light and/or radio frequency signals, can further help identify the respective beacons. For example, within the RF signal being transmitted can be a repeating portion which designates packets of metadata, and within those packets of metadata can be an ID of the RF tower generating the RF signal. With respect to the LED lights, as described above the lights can turn off and on in a particular pattern, thereby allowing the light to be identified based on the pattern. Likewise, the LED light can vary in frequency (that is, the light produced by the LEDs can vary within the electromagnetic spectrum), thereby conveying the identity of the light based on the particular frequency of the light.

In some configurations, the secondary location system activated can be augmented to perform additional actions such as: pre-processing the verified radio frequency beacons prior to performing the visual scan, the pre-processing narrowing the geographic area to a subset of the geographic area; and wherein the comparing of the particular visual frequency of each of the visual beacons is limited to those visual beacons within the subset of the geographic area, and wherein limiting the comparison of particular visual frequency of visual beacons to the subset of the geographic area provides increased processing efficiency over comparing the particular visual frequency of visual beacons of an entirety of the geographic area.

In some configurations, the secondary location system can include an ultra-wideband transceiver.

In some configurations at least one of the visual beacons is mounted on a mobile ground vehicle, or on an aerial vehicle.

In some configurations, the radio frequency beacons employ analog modulation.

Figure 6:
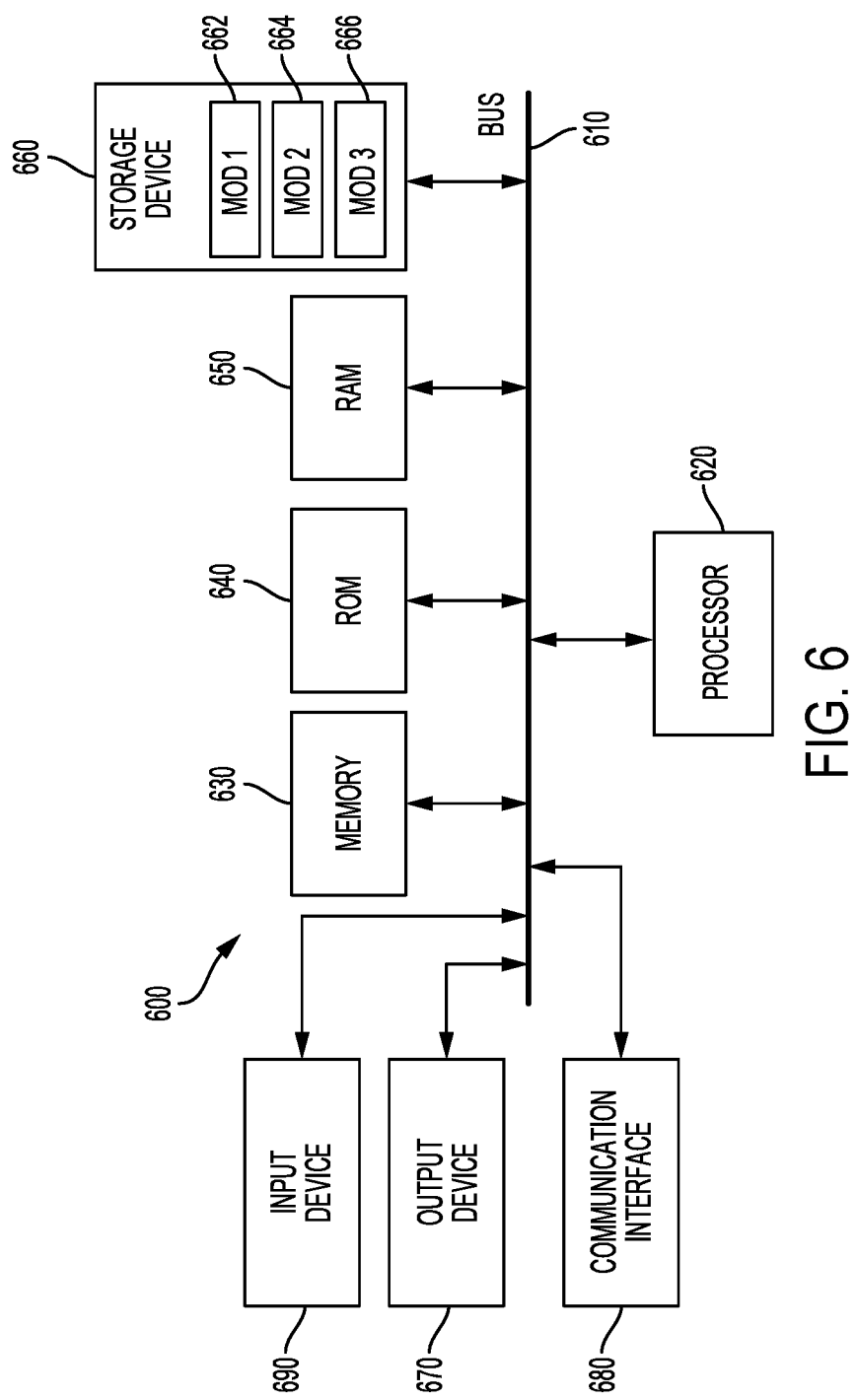
FIG. 6 illustrates an exemplary computer system.

With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMS) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:
1. A method comprising:
identifying, on an autonomous vehicle which is traveling, a loss of a primary location system, the primary location system comprising Global Positioning System navigation;
activating a secondary location system which:
performs a radio frequency sweep of a geographic area around the autonomous vehicle to identify radio frequency beacons;
compares the radio frequency beacons to known ground stations, to yield verified radio frequency beacons;
performs a visual scan, via a camera, of the geographic area to identify visual beacons, each visual beacon having a particular visual frequency;
compares the particular visual frequency of each of the visual beacons to known visual beacons, to yield verified visual beacons; and
identifies a current location of the autonomous vehicle by triangulating the verified radio frequency beacons and the verified visual beacons; and
generating a route to a stopping location based on the current location produced by the secondary location system.

2. The method of claim 1, wherein the visual beacons are LED lights configured to shine vertically upward.

3. The method of claim 1, wherein the radio frequency beacons transmit metadata containing beacon identification.

4. The method of claim 1, wherein the secondary location system performs additional actions comprising:

pre-processing the verified radio frequency beacons prior to performing the visual scan, the pre-processing narrowing the geographic area to a subset of the geographic area; and wherein the comparing of the particular visual frequency of each of the visual beacons is limited to those visual beacons within the subset of the geographic area, and wherein limiting the comparison of particular visual frequency of visual beacons to the subset of the geographic area provides increased processing efficiency over comparing the particular visual frequency of visual beacons of an entirety of the geographic area.

5. The method of claim 1, wherein the secondary location system comprises an ultra-wideband transceiver.

6. The method of claim 1, wherein at least one of the visual beacons is mounted on a mobile ground vehicle.

7. The method of claim 1, wherein the radio frequency beacons employ analog modulation.

8. An autonomous vehicle, comprising:
a primary location system, the primary location system using Global Positioning System navigation;
a secondary location system;
a processor; and
a computer-readable storage medium having instructions stored which, when executed by the processor, cause the processor to perform operations comprising:
identifying, on an autonomous vehicle which is traveling, a loss of the primary location system;
activating the secondary location system which:
performs a radio frequency sweep of a geographic area around the autonomous vehicle to identify radio frequency beacons;
compares the radio frequency beacons to known ground stations, to yield verified radio frequency beacons;
performs a visual scan, via a camera, of the geographic area to identify visual beacons, each visual beacon having a particular visual frequency;
compares the particular visual frequency of each of the visual beacons to known visual beacons, to yield verified visual beacons; and
identifies a current location of the autonomous vehicle by triangulating the verified radio frequency beacons and the verified visual beacons; and
generating a route to a stopping location based on the current location produced by the secondary location system.

9. The autonomous vehicle of claim 8, wherein the visual beacons are LED lights configured to shine vertically upward.

10. The autonomous vehicle of claim 8, wherein the radio frequency beacons transmit metadata containing beacon identification.

11. The autonomous vehicle of claim 8, wherein the secondary location system performs additional actions comprising:
pre-processing the verified radio frequency beacons prior to performing the visual scan, the pre-processing narrowing the geographic area to a subset of the geographic area; and
wherein the comparing of the particular visual frequency of each of the visual beacons is limited to those visual beacons within the subset of the geographic area, and wherein limiting the comparison of particular visual frequency of visual beacons to the subset of the geographic area provides increased processing efficiency over comparing the particular visual frequency of visual beacons of an entirety of the geographic area.

12. The autonomous vehicle of claim 8, wherein the secondary location system comprises an ultra-wideband transceiver.

13. The autonomous vehicle of claim 8, wherein at least one of the visual beacons is mounted on a mobile ground vehicle.

14. The autonomous vehicle of claim 8, wherein the radio frequency beacons employ analog modulation.

15. A non-transitory computer-readable storage medium having instructions stored which, when executed by a computing device, cause the computing device to perform operations comprising:
identifying, on an autonomous vehicle which is traveling, a loss of a primary location system, the primary location system comprising Global Positioning System navigation;
activating a secondary location system which:
performs a radio frequency sweep of a geographic area around the autonomous vehicle to identify radio frequency beacons;
compares the radio frequency beacons to known ground stations, to yield verified radio frequency beacons;
performs a visual scan, via a camera, of the geographic area to identify visual beacons, each visual beacon having a particular visual frequency;
compares the particular visual frequency of each of the visual beacons to known visual beacons, to yield verified visual beacons; and
identifies a current location of the autonomous vehicle by triangulating the verified radio frequency beacons and the verified visual beacons; and
generating a route to a stopping location based on the current location produced by the secondary location system.

16. The non-transitory computer-readable storage medium of claim 15, wherein the visual beacons are LED lights configured to shine vertically upward.

17. The non-transitory computer-readable storage medium of claim 15, wherein the radio frequency beacons transmit metadata containing beacon identification.

18. The non-transitory computer-readable storage medium of claim 15, wherein the secondary location system performs additional actions comprising:
pre-processing the verified radio frequency beacons prior to performing the visual scan, the pre-processing narrowing the geographic area to a subset of the geographic area; and
wherein the comparing of the particular visual frequency of each of the visual beacons is limited to those visual beacons within the subset of the geographic area, and wherein limiting the comparison of particular visual frequency of visual beacons to the subset of the geographic area provides increased processing efficiency over comparing the particular visual frequency of visual beacons of an entirety of the geographic area.

19. The non-transitory computer-readable storage medium of claim 15, wherein the secondary location system comprises an ultra-wideband transceiver.

20. The non-transitory computer-readable storage medium of claim 15, wherein at least one of the visual beacons is mounted on a mobile ground vehicle.

* * * * *